United States Patent
Wood

(10) Patent No.: US 11,678,758 B2
(45) Date of Patent: Jun. 20, 2023

(54) RESILIENT FLOOR MAT FOR AUTOMOBILE REPAIR

(71) Applicant: Colin Wood, Barrow upon Humber (GB)

(72) Inventor: Colin Wood, Barrow upon Humber (GB)

( * ) Notice: Subject to any disclaimer, the term of this patent is extended or adjusted under 35 U.S.C. 154(b) by 145 days.

(21) Appl. No.: 17/012,934

(22) Filed: Sep. 4, 2020

(65) Prior Publication Data

US 2021/0068573 A1 Mar. 11, 2021

Related U.S. Application Data

(60) Provisional application No. 62/896,947, filed on Sep. 6, 2019.

(51) Int. Cl.
| | | |
|---|---|---|
| *B25H 5/00* | (2006.01) | |
| *A47G 27/02* | (2006.01) | |
| *B60S 5/00* | (2006.01) | |

(52) U.S. Cl.
CPC ........... *A47G 27/0237* (2013.01); *B25H 5/00* (2013.01); *B60S 5/00* (2013.01)

(58) Field of Classification Search
CPC ............ A47G 27/0237; A47G 27/0212; A47G 27/0231; A47G 27/02; A47L 23/22; A47L 23/26; A47L 23/266; B25H 5/00; B25H 7/00; B25H 7/02; B25H 7/04; B25H 7/045; B60S 5/00
See application file for complete search history.

(56) References Cited

U.S. PATENT DOCUMENTS

| | | | | |
|---|---|---|---|---|
| 2,016,546 A | * | 10/1935 | Giebel | B25H 7/04 |
| | | | | 33/274 |
| 2,188,677 A | * | 1/1940 | Dickinson | B60S 5/00 |
| | | | | 362/496 |
| 4,792,232 A | * | 12/1988 | Jobe | G06T 7/521 |
| | | | | 356/394 |
| 5,414,518 A | * | 5/1995 | Yazejian | G01N 21/8803 |
| | | | | 356/613 |
| 6,798,525 B1 | * | 9/2004 | Willing | G01N 21/8803 |
| | | | | 356/600 |
| 8,206,002 B1 | * | 6/2012 | Olson | F21V 33/00 |
| | | | | 362/153.1 |
| 9,291,337 B1 | * | 3/2016 | Hulett | F21V 21/0925 |
| 9,791,269 B2 | * | 10/2017 | Krebber | G01B 11/306 |
| 10,036,550 B1 | * | 7/2018 | Reid | G08G 1/0955 |
| 10,434,745 B2 | * | 10/2019 | Smith | B32B 7/022 |
| 10,451,558 B1 | * | 10/2019 | Chenvert | G01N 21/8806 |
| 10,578,298 B2 | * | 3/2020 | Knight | F21V 33/00 |
| 11,000,142 B2 | * | 5/2021 | Girard | E04F 15/163 |
| 11,000,443 B2 | * | 5/2021 | Gallagher | A61H 7/001 |
| 11,453,195 B2 | * | 9/2022 | Bing | D06N 7/0089 |
| 11,529,934 B2 | * | 12/2022 | Giarrizzo, Jr. | B60S 5/00 |
| 2004/0091674 A1 | * | 5/2004 | Altshuler | A47G 27/0231 |
| | | | | 428/174 |
| 2004/0148725 A1 | * | 8/2004 | Blum | A47L 23/266 |
| | | | | 15/215 |
| 2016/0235235 A1 | * | 8/2016 | Burden | A47G 27/0206 |
| 2020/0078931 A1 | * | 3/2020 | Folse | A47G 27/0212 |

* cited by examiner

*Primary Examiner* — James M Dolak
(74) *Attorney, Agent, or Firm* — Chernoff, Vilhauer, McClung & Stenzel, LLP

(57) ABSTRACT

Devices and methods that assist in the repair of an automobile.

16 Claims, 5 Drawing Sheets

RESILIENT FLOOR MAT FOR AUTOMOBILE REPAIR

CROSS REFERENCE TO RELATED APPLICATIONS

None

BACKGROUND

The subject matter of this application relates to a resilient floor mat used to assist in the repair of an automobile.

The traditional process for repairing a dent in automobiles starts with the step of gently hammering the dent from behind the damaged area of a car to approximately return the metal to its original shape. Subsequently, the paint in the damaged area is grinded away and a filler material is used to even out the surface before smoothing it with a sander. Finally, the area is repainted with a color that matches the original paint as closely as possible, and blended into the adjacent panels to hide any color differences. A perfect paint match is not possible, however due to the differences in factory materials and techniques, and those available to body shops.

A more recent technique, called Paintless Dent Repair (PDR) takes advantage of the flexibility of modern factory paints to repair dents without the need for grinding away the original paint, therefore obviating any issues with post-repair color mismatch. In a typical PDR dent removal process, the dented portion of the metal is massaged back into its original position using specialized tools, beginning from around the outside edge of the dent and slowly working inwards. The dent becomes progressively smaller as the technician works from the outside edge; eventually the dent becomes so small it blends with the texture of the paint and disappears completely. Depending on the location of the damage, the panel is accessed by removing trim pieces, through window openings or by removing inner panels.

Paintless dent repair is much less expensive than a body shop repair because much less repair time is required, most minor dents being fixable within an hour, and no painting costs are incurred. However, successful PDR requires a technician to manipulate precise locations of metal to restore the dented metal to its correct height, which in turn requires the ability to clearly identify the location and contours of the dent throughout the repair process.

What is desired therefore, are improved devices and methods used for visualizing the location and contours of a dent during a repair process.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1A:
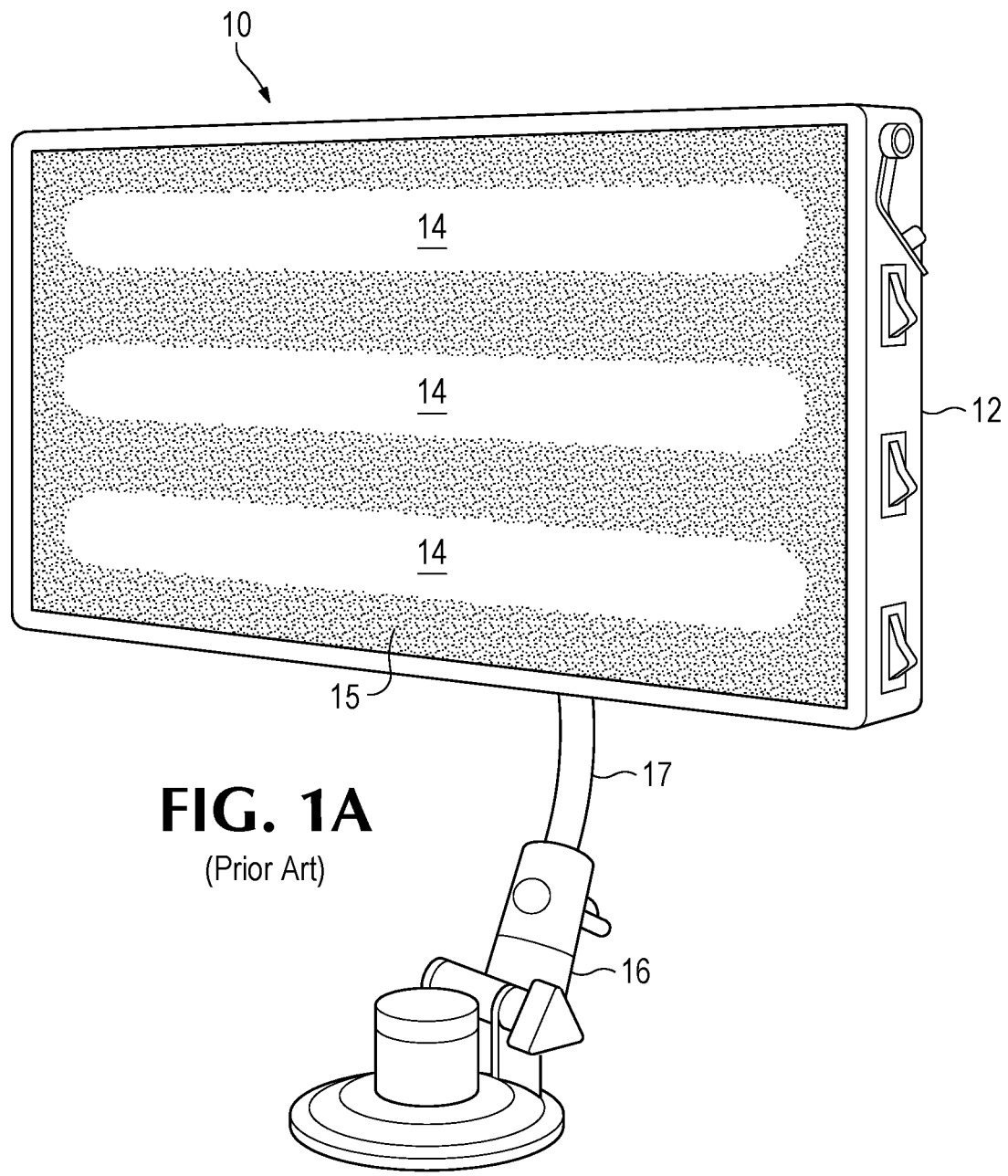
FIG. 1A shows an exemplary prior art lamp used to identify the location and geometry of a dent.
Figure 1B:
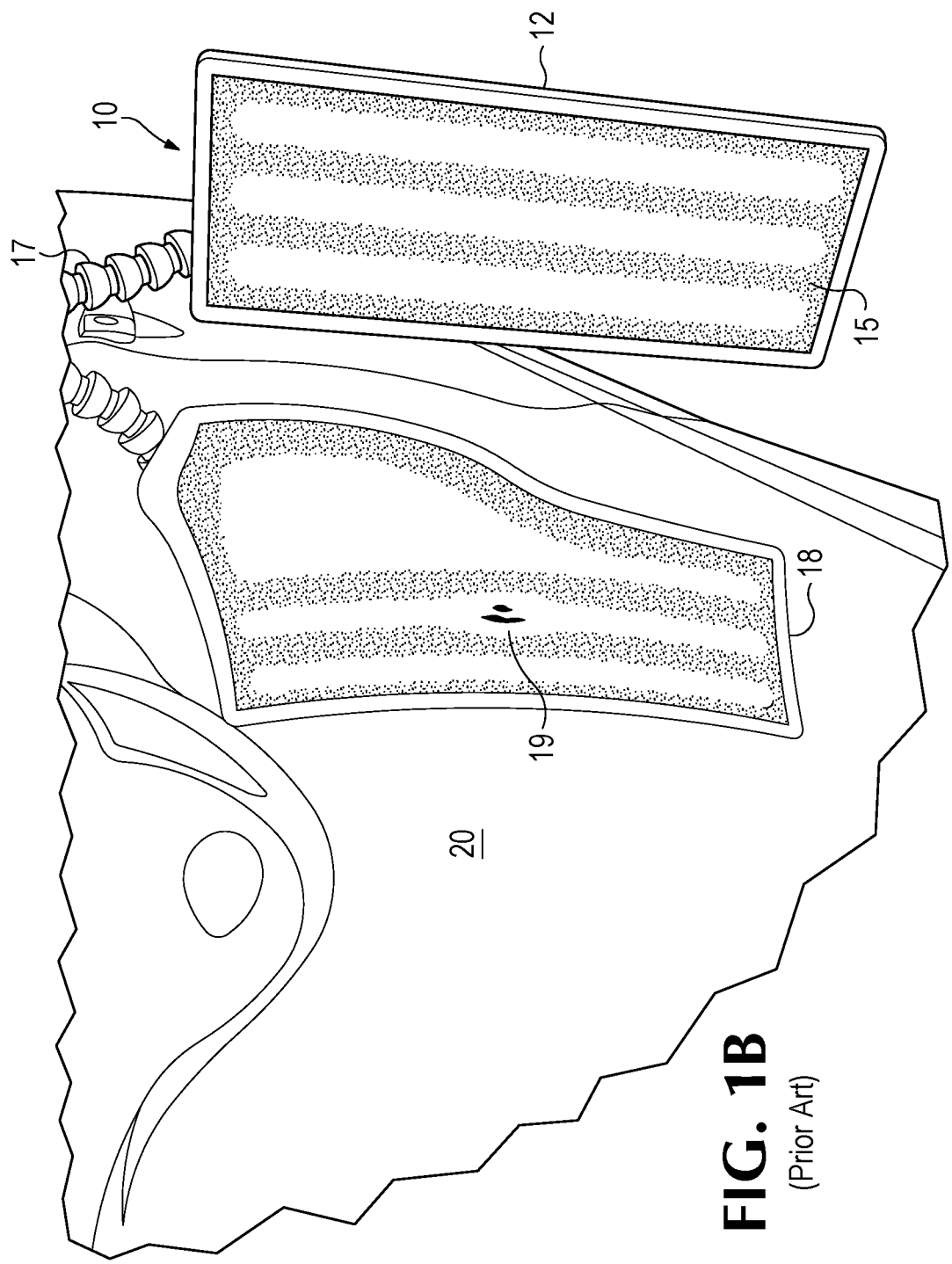
FIG. 1B shows an exemplary prior art lamp illuminating a dent in an automobile.

As noted previously, the PDR process gradually massages a dent in an automobile back to its original position using a set of specialized tools, and this process requires that a technician manipulate precise locations of metal to the correct height. Thus, throughout the repair process, the technician should preferably be able to identify the location of a dent and be able to observe its contours as the dent is gradually repaired. FIG. 1 shows an exemplary lamp 10 having a frame 12 that houses a plurality of fluorescent or LED bulbs 14 that selectively provide illumination emanating from the outer surface 15 of the lamp 10, which in turn assists a technician in visualizing the deformation of a dent and to also aid the technician in locating the tip of the tool being used to push the metal. FIG. 1B shows such a lamp 10 positioned adjacent a vehicle 20 such that the lamp 10 projections a reflection 18 onto a damaged surface of the vehicle. As can be seen in this figure, a dent in the surface has created a clearly visible distortion 19 in the reflection 18 cast from the lamp 10, where the distortion indicates the contours of the dent, which can be repaired. During the repair process, the dented region is gradually forced back to its original contour while continuously illuminated, so that the technician can visually observe the distortion 19 in the reflection 18 diminishing in size until it no longer exists. Without a reflection from a light source or board to read the dent, the fine detail of the process may not be suitable for the technician, and full repair of a dent may not be possible. Though the light sources shown in FIGS. 1A and 1B show a light panel with an internal light source, other such light sources comprise a panel with a translucent design on one or both of its opposed outwardly-facing surfaces so that a backlight may be used to shine through the panel and thereby project light on the surface of an automobile, create a reflected image that distorts around dents.

Though effective, the lamp 10 or similar panel is often cumbersome as it must be moved around the exterior of a vehicle, as well as reoriented at various angles during cross-checking to make sure that a dent has been in fact adequately repaired. to that end, lamps 10 typically include suction cups 16 and positioning hoses 17 so that the lamp and/or light panel can be positioned in various locations and tilt angles around the vehicle.

Figure 2:
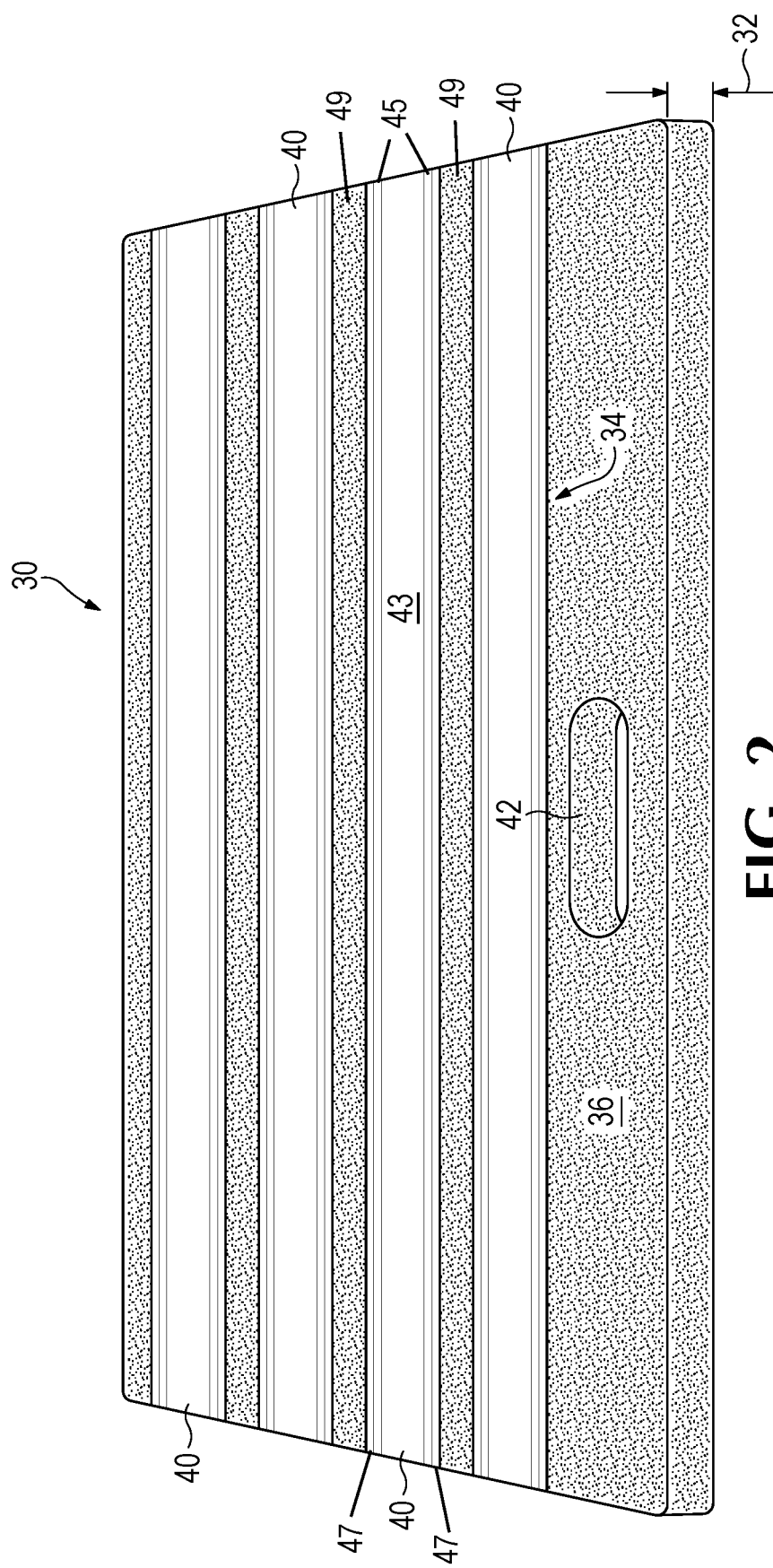
FIG. 2 shows an exemplary resilient floor mat having a first surface of emulating the functionality of a lamp so as to identify the location and geometry of a dent.
Figure 3:
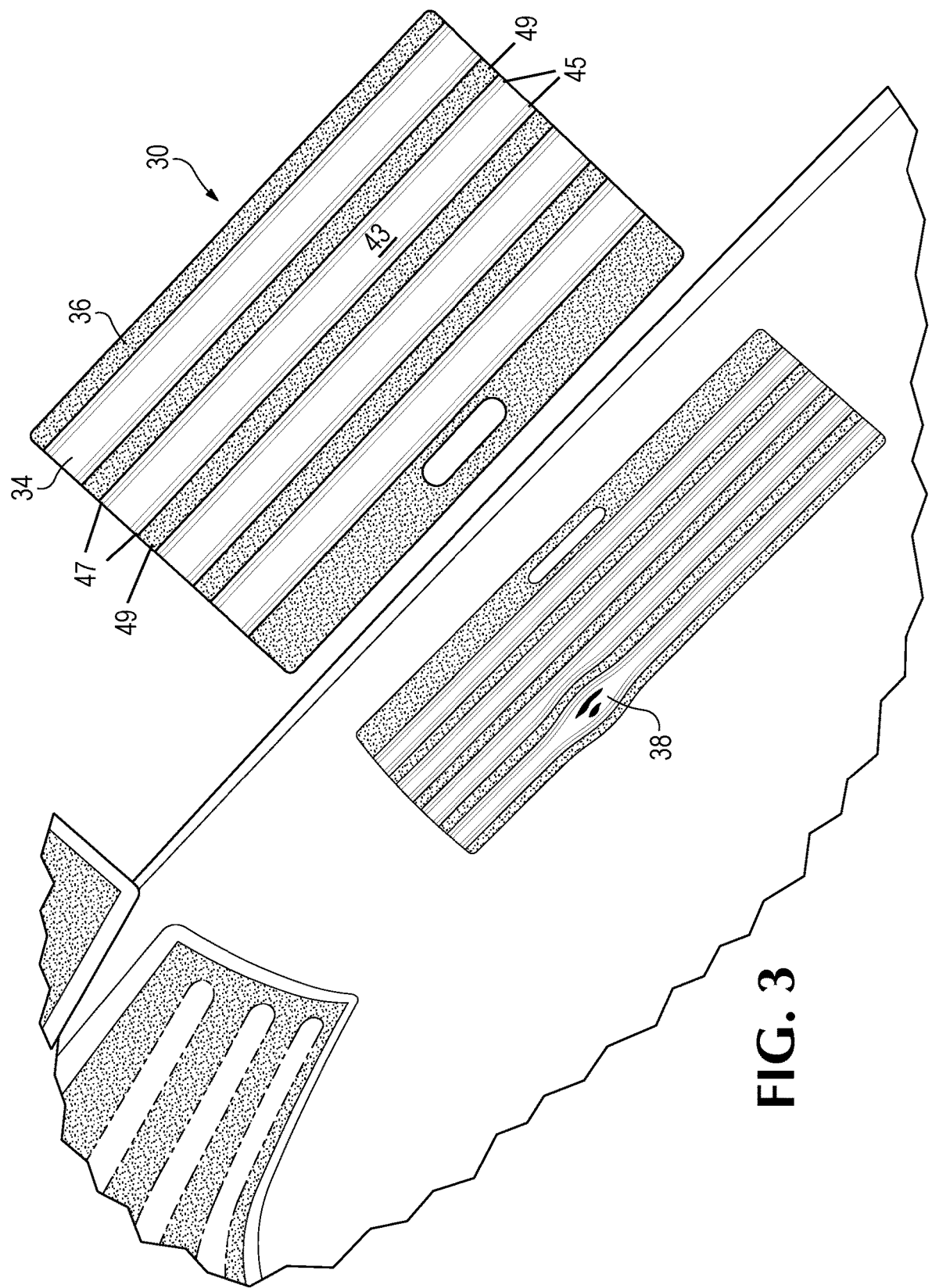
FIG. 3 shows the floor mat of FIG. 2 illuminating a dent in an automobile.

FIG. 2 shows an alternate device 30 for casting an image on a vehicle during a repair process. In a preferred embodiment, the device 30 is a mat having a thickness 32 and fabricated from a resilient foam material that provides an opaque backing for an image 34 fabricated on a first outer surface 36 of the mat 30. In the embodiment shown in FIG. 2, the image 34 preferably simulates fluorescent or LED bulbs of a lamp. Specifically, the image 34 is configured to reflect ambient light, or light from another source towards a vehicle, such that the image cast onto the vehicle emulates that of fluorescent or LED bulbs that emit light onto a vehicle. Thus, unlike the lamp 10 shown in FIGS. 1A and 1B, the device of FIG. 3 causes a first reflection projected from the surface 36 towards a vehicle, the first reflection forming an image that is in turn reflected again from the vehicle surface. As can be seen in FIG. 3, the reflection in the surface of the vehicle also forms a distortion 38 around a dent.

The image 34 formed on the surface 36 preferably simulates a plurality of elongate, linear bulbs. For example, in the exemplary embodiment of FIG. 2, the image 34 comprises four elongate linear elements 40, each element 40 having a bright central white region 43, surrounded at its periphery by a yellow line 45, which in turn is enclosed by an orange line 47. Each linear element 40 is spaced in an equidistant manner from its adjacent linear elements by a dark black region 49. Thus, ambient light reflecting off of the surface 30 and onto an adjacent vehicle is substantially similar to the reflected image formed on a vehicle by a nearby lamp or panel, as can be seen in FIG. 3. Although the coloration shown in FIGS. 2 and 3 is preferable, other color schemes may also be appropriate to simulate light emitted from a bulb, such as a cooler color scheme that transitions from a central white region to a surrounding dark blue or green region.

Though preferably the image 34 is configured to create an appropriate reflection on a vehicle using ambient light, such as sunlight and/or interior lighting in an automobile repair shop, some techniques may position the mat 30 next to a lamp 10 such that the light from the lamp 10 is reflected from the surface of the mat 30, which may enhance the effectiveness of the mat 10.

In some embodiments, the mat 30 may be a foam kneeling mat made of a closed-cell foam rubber material so that the mat 30 may be used to protect a technician's knees while repairing a vehicle. Furthermore, the mat 30 may in some embodiments include a cut-away handle portion 42 to facilitate manual movement of the mat around the surface of the vehicle when cross-checking repairs to dents.

Figure 4:
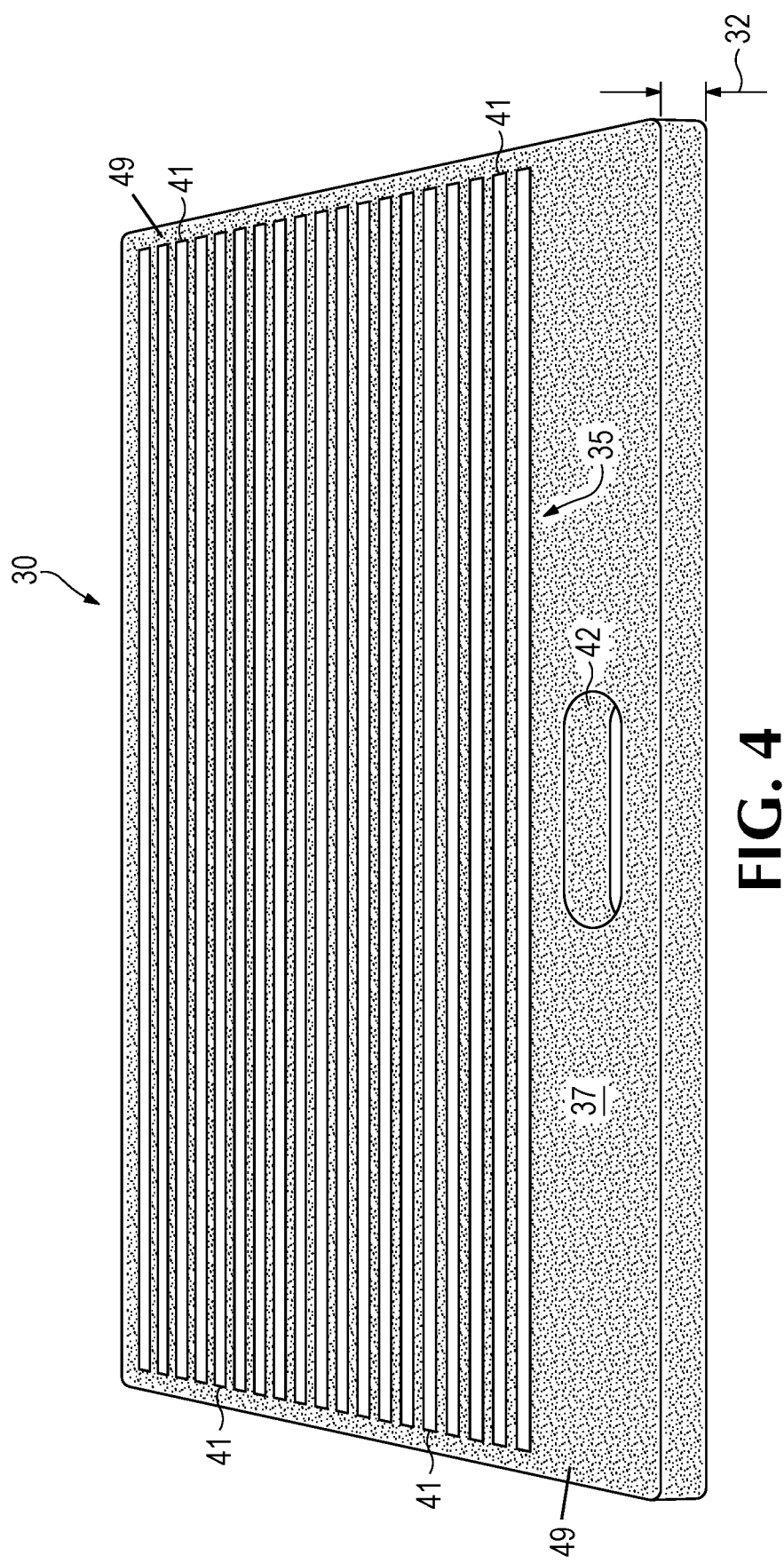
FIG. 4 shows a second surface of an embodiment of the mat of FIG. 1, also capable of emulating the functionality of a lamp so as to identify the location and geometry of a dent.

Referring to FIG. 4, an image 35 on a mat 30 may in some embodiments comprise a striped pattern of equidistant bright lines 41 of a white or similar light color against a dark background or reoion 49. Such an image 35 will similarly create a functional reflection on a vehicle surface, with patterns distorted by dents, by reflecting ambient or other light from the surface 37 of the mat 30 towards the vehicle. Furthermore, some lamps such as those shown in FIGS. 1A and 1B comprise a series of fluorescent or LED white tubes, and thus the image 35 may similarly work in conjunction with such a lamp to enhance the reflected image on a vehicle from the surface 37. In some preferred embodiments, a mat 30 may form both the image 34 and the image 35, each on a respective one of the two opposed planar surfaces of the mat 30, so that a technician may select a preferred image to use in the repair by simply selecting which side of the mat 30 to reflect light toward the vehicle.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A mat having an outwardly-directed opaque planar surface, the surface comprising an image having a first pattern that, when reflected by ambient light, facilitates the repair of a vehicle by emphasizing the location and geometry of any dents in the surface of the vehicle, the first pattern showing at least two linear elements, each spaced from one another by a dark background, each linear element having a bright central region surrounded on either side by a darker side region.

2. The mat of claim 1 where the first pattern simulates that of a plurality of spaced apart bulbs in a lamp.

3. The mat of claim 2 having a second pattern on a second opaque planar surface, the second pattern facilitating the repair of a vehicle and different from the first pattern.

4. The mat of claim 1 having a second pattern on a second opaque planar surface, the second pattern facilitating the repair of a vehicle and different from the first pattern.

5. The mat of claim 1 where the mat reflects the image from ambient light.

6. The mat of claim 1 where the mat is fabricated of a resilient material suitable for a knee mat.

7. The mat of claim 6 made of rubber.

8. The mat of claim 1 where the pattern shows at least two linear elements, each spaced from one another by a dark background, and each linear element having a bright central region surrounded on each side by a side region that grows progressively darker.

9. The mat of claim 8 where the central region is white, and the side region has an inner portion that is yellow and an outer portion that is orange.

10. A foam rubber kneeling mat having an outwardly-directed opaque planar surface configured with a pattern fabricated on the surface so that, when placed proximate a motor vehicle, the planar surface will produce a reflection from the surface of the motor vehicle, the reflection from the surface of the motor vehicle emphasizing the location and geometry of any dents in the surface of the motor vehicle and produced by light reflected off of the opaque planar surface, the pattern showing at least two linear elements, each spaced from one another by a dark background, each linear element having a bright central region surrounded on either side by a darker side region.

11. The mat of claim 10 where the pattern simulates that of a plurality of spaced apart bulbs in a lamp.

12. The mat of claim 11 having a second pattern on a second opaque planar surface, the second pattern facilitating the repair of a vehicle and different from the first pattern.

13. The mat of claim 10 having a second pattern on a second opaque planar surface, the second pattern facilitating the repair of a vehicle and different from the first pattern.

14. The mat of claim 10 where the mat reflects the image from ambient light.

15. The mat of claim 10 where the pattern shows at least two linear elements, each spaced from one another by a dark background, and each linear element having a bright central region surrounded on each side by a side region that grows progressively darker.

16. The mat of claim 15 where the central region is white, and the side region has an inner portion that is yellow and an outer portion that is orange.

* * * * *